United States Patent
Phillips, Jr.

[15] 3,641,472
[45] Feb. 8, 1972

[54] EXTERIOR POWER SUPPLY CONNECTION FOR RECREATION VEHICLES

[72] Inventor: Lawrence Phillips, Jr., Laguna Beach, Calif.

[73] Assignee: Unicorn Industries, Inc., Anaheim, Calif.

[22] Filed: Sept. 14, 1970

[21] Appl. No.: 71,835

[52] U.S. Cl. ................................. 339/10, 280/422, 339/28, 339/122 R, 339/136 R
[51] Int. Cl. ................................. H01r 33/00, H01r 13/60
[58] Field of Search ................ 339/28, 10, 136, 143, 119, 339/120, 122, 123, 166; 174/53, 59, 66, 67; 52/221; 191/4; 280/420, 422

[56] References Cited

UNITED STATES PATENTS

| | | | |
|---|---|---|---|
| 2,723,380 | 11/1955 | Howard | 339/10 |
| 2,658,185 | 11/1953 | Hatcher | 339/188 |
| 969,409 | 9/1910 | Russell | 339/122 |
| 2,881,240 | 4/1959 | Self | 174/58 |
| 3,439,108 | 4/1969 | Zerwes | 174/53 |

*Primary Examiner*—Marvin A. Champion
*Assistant Examiner*—Robert A. Hafer
*Attorney*—Christie, Parker & Hale

[57] ABSTRACT

An exterior power supply connection for supplying electrical power from a permanent power source to the interior of a recreation vehicle is adapted to be mounted in aligned openings in the walls of the vehicle, with a faceplate inside the vehicle and a slanted rainproof shield outside the vehicle. A pair of slots in opposite lateral walls of the adapter receive the outer shell of the vehicle and a clamping frame. A fastener between the frame and the shield causes the frame and the faceplate to bear tightly on the vehicle walls to secure the supply connection in place. A female receptacle mounted in the faceplate faces the interior of the vehicle, and a male receptacle disposed in a compartment located under the shield faces the outside. A slanted, downwardly opening coverplate is spring biased to cover the male receptacle. In use, a connector on a cord from the power supply is connected with the male receptacle in the compartment to supply power through the female receptacle to the interior of the vehicle.

10 Claims, 3 Drawing Figures

PATENTED FEB 8 1972 3,641,472
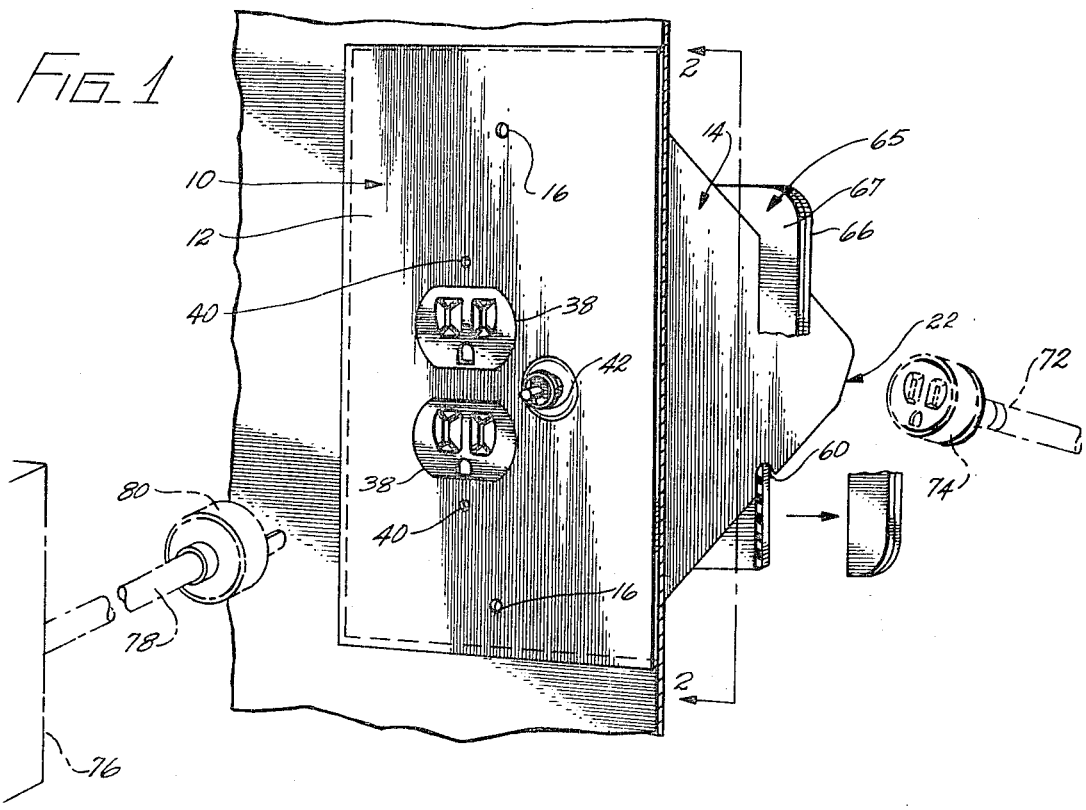
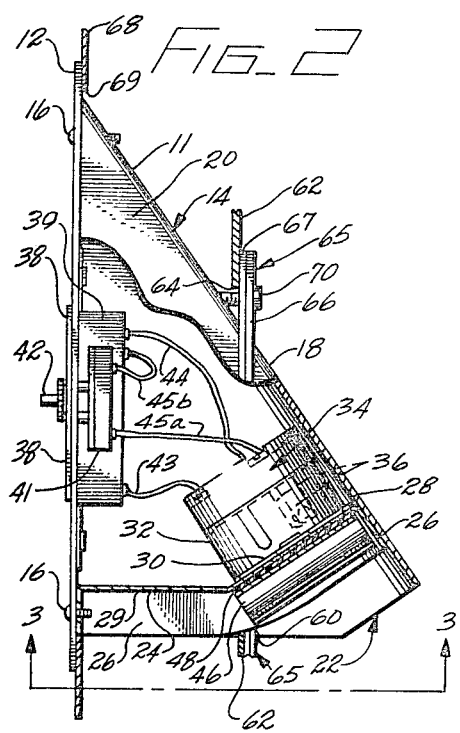
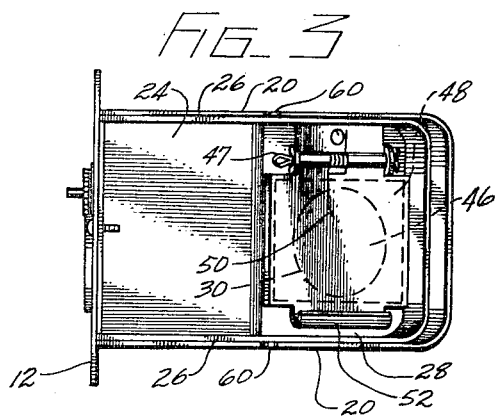
INVENTOR.
LAWRENCE PHILLIPS JR.
BY
Christie, Parker, & Hale
ATTORNEYS

EXTERIOR POWER SUPPLY CONNECTION FOR RECREATION VEHICLES

BACKGROUND OF THE INVENTION

This invention relates to an exterior power supply connection for delivering electrical power to the interior of recreation vehicles and the like.

An electrical outlet or female receptacle inside a recreation vehicle may be coupled to a permanent power source in a campground or the like through the use of a connection that extends through the wall of the vehicle. A connector on a cord from the power source is coupled to the connection outside the vehicle to supply power to the interior of the vehicle. Such a connection should be constructed to isolate its electrical components from the effects of weather. Furthermore, the connection should have means for conveniently and safely mounting the connection permanently in place.

SUMMARY OF THE INVENTION

Briefly, this invention provides an exterior power supply connection for supplying electrical power from a permanent power source to the interior of a recreation vehicle.

The power supply connection includes a housing adapted to be mounted in an opening in the walls of the vehicle. The housing has a faceplate for disposition within the interior of the vehicle, and a rainproof shield extending outside the vehicle. A first electrical receptacle, which is preferably a female receptacle mounted in an opening in the faceplate, faces the interior of the vehicle. A second electrical receptacle, which may be a male receptacle, is disposed within a compartment under the shield facing the outside of the vehicle. The second receptacle is adapted to be connected to a cooperating electrical connector from the permanent power source. A cover plate is disposed over the compartment as a moisture and water barrier for the second receptacle. Electrical conductor means within the housing establishes a circuit connection between the first and second electrical receptacles. In use, the connector from the exterior power source is connected to the second receptacle to supply power through the first receptacle to the interior of the vehicle.

In a more specific form of the present invention, the upper surface of the shield slants downwardly away from the faceplate to facilitate water shedding. The cover plate is spring biased into a closed position over the second electrical receptacle and the inner wall of the cover plate is provided with weather insulation for protecting this receptacle from the effects of weather. The second electrical receptacle is mounted within the compartment so its axis slants slightly from the horizontal upward and the receptacle faces the outside of the power supply connection. For ease in mounting, a pair of slots in the lateral walls of the housing are adapted to receive the outer shell of the vehicle and a clamping frame. With the slots and clamping frame the entire power source connection can be secured in place by a fastener between the outer shell and the housing which clamps the faceplate against the inner wall of the vehicle and the clamping frame against the outer shell of the vehicle.

The rainproof shield protects the electrical components within the housing from the effects of the weather, and the shielded compartment and coverplate provide protection from the weather for the electrical receptacle within the compartment for the exterior power source. The mounting of this electrical receptacle in a slanted position facilitates the ease of connection with the exterior power source.

These and other features and advantages of the present invention will become more fully apparent from the following description, appended claims and drawings.

BRIEF DESCRIPTION OF THE DRAWINGS

FIG. 1 is a perspective view, partly exploded, of the exterior power supply connection mounted in an opening through the walls of a recreation vehicle;

FIG. 2 is an elevational view taken along line 2—2 of FIG. 1; and

FIG. 3 is a bottom view taken along line 3—3 of FIG. 2.

DESCRIPTION OF THE PREFERRED EMBODIMENT

An exterior power supply connection 10 has a body or housing 11 which is attached to a flat upright faceplate 12. The housing has a downwardly opening and rearwardly projecting shield 14. Faceplate 12 is secured to the housing by screws 16.

The shield has a wall 18 that has a downward slant for shedding water. Wall 18 also extends away from the rear of faceplate 12. A pair of upright sidewalls 20 of the shield are integral with wall 18 and extend at right angles from the faceplate. A lower rear portion 22 of each of the sidewalls has a lower edge disposed at an acute angle to the horizontal and which extends from the lowest extreme of the edge away from faceplate 12 to merge into wall 18.

A support plate 24 with downwardly turned marginal edges 26 is disposed within an opening defined by sidewalls 20, slanting wall 18 and faceplate 12 at the bottom of the housing. Marginal edges 26 are spot welded to sidewalls 20 so as to define with the faceplate, sidewalls and slanting wall an enclosed electrical housing that is substantially rainproof and otherwise capable of protecting electrical components within it from the effects of weather. The support plate is mounted so that the bottom edges of the sidewalls 20 and the bottom edge of slanting wall 18 project downwardly below the proximate lower surface of the support plate.

Support plate 24 has an upwardly curved rear portion 28 which extends to wall 18 at about a right angle to it from a generally horizontal portion 29 of the support plate. The rear portion of the support plate has a hole 30 opening into the interior of housing 11. An electrical male receptacle 32 is secured to the inner wall of support plate 24 within the housing over hole 30. Male electrical contacts 36 of receptacle 32 face hole 30 and extend downwardly at an acute angle from the vertical toward rear portion 22 generally parallel to wall 18 into a compartment of the receptacle. This orientation of the male receptacle provides easy, though shielded, access to a connector from a power source.

A pair of vertically spaced-apart electrical female receptacles 38 extend through matching openings in faceplate 12. These receptacles are mounted in a fixed plug receiving position relative to faceplate 12 by fastening the top and bottom of their receptacle body 39 inside the housing 11 to the inner wall of the faceplate with rivets 40. A circuit breaker 41 fastened to the inner wall of the faceplate within housing 11 has a reset pushbutton 42 extending out through an opening in the faceplate.

Male receptacle 32 is electrically ground coupled with each female electrical receptacle 38 through a ground wire 43. A first lead wire 44 extends from a terminal on the plug body to a terminal at the rear of the receptacle body 39. A second hot lead wire 45a from another terminal on the plug body is connected to the input terminal of the circuit breaker 41. A third lead wire 45b leads from the output terminal of the circuit breaker to a terminal at the rear of the receptacle body 39. Thus, the circuit breaker is connected in series with the female electrical receptacles 38 and male receptacle 32 and provides circuit protection for power supply connection 10.

A flat cover plate 46 disposed over opening 30 to male receptacle 32 is connected through a hinge 47 to support plate 24 so that the cover plate is capable of pivoting toward and away from the opening. The cover plate has a thin piece of insulation 48, preferably latex or polyurethane foam, secured to its inner wall so that the insulation bears on support plate 24 when the coverplate is in its closed position. An elongated coil spring 50 wound around the hinge pin of hinge 47 engages the lower face of cover plate 46 and the stationary part of hinge 47 to urge the cover plate to its closed position. A curved flange 52 on the cover plate provides a handle to gain access to male plug receptacle 32.

An important feature of the present invention, which can be best understood by reference to FIGS. 1 and 2, is the ease of mounting power supply connection 10 in a vehicle. Each of the sidewalls 20 has a notch or slot 60 for receiving an outer shell or wall 62 of a vehicle (FIG. 2). The outer shell supports the power supply connection, then, at the points of engagement between the sidewalls and the shell at the upper portion of the slots. As seen in FIG. 2, the outer shell has an opening 64 through which the power supply connection's shield 14 extends. A clamping frame 65 fits entirely around shield 14 for bearing against the outer surface of shell 62. The clamping frame includes a frame proper 66 and a gasket 67. An inner shell or wall 68 of the vehicle has an opening 69 through which shield 14 extends. Installed, faceplate 12 bears on the outer surface of inner shell or wall 68 (the surface facing the interior of the vehicle) and gasket 67 bears on the outer surface of shell 62. A fastener, say a screw 70, through frame 65 and wall 18 secures the entire power supply connection firmly in place. When mounting the power supply connection, the connection is placed through openings 64 and 69 and allowed to drop so that notches 60 receive wall 62. Clamping frame 65, which is also received in notches 60 is positioned against the outer shell and then fastener 70 is installed.

When installed, power supply connection 10 has electrical female receptacles 38 facing the interior of a vehicle, with the rear portion 22 outside wall 62 of the vehicle. A cord 72 from the exterior power source has a connector 74. Cover plate 64 is opened to provide access to male receptacle 32 and connector 74 is engaged with it. Power is supplied to an appliance 76 inside the vehicle through a cord 78 having a plug 80 adapted to engage one of the female receptacles 38 in faceplate 12.

The slope of wall 18 protects the electrical components in housing 11 from the effects of the weather, and the cover plate with insulation 48 protects the interior of the plug housing from moisture and splash when the cover plate is closed. Gasket 67 provides protection for the interior of the vehicle and the space between walls 62 and 68.

The angled rear portion 22 of the housing and the slanted mounting of receptacle 32 make contacts 36 easily accessible to the user. The connection with connector 74 and receptacle 32 is well within the housing so that the slant of wall 18 and downwardly projecting sidewalls 20 provide a shield which directs water away from the connection.

What is claimed is:

1. An exterior power supply connection for supplying electrical power from an external power source to the interior of a recreation vehicle or the like comprising:
   a. a housing adapted to be mounted in the vehicle having:
      i. a faceplate for disposition within the interior of the vehicle;
      ii. a pair of sidewalls extending from the faceplate for partial disposition outside the vehicle; and
      iii. an upper wall extending from the faceplate and capping the sidewalls, the upper wall being at an acute angle to the faceplate and extending downwardly from the top thereof for partial disposition outside the vehicle to facilitate the shedding of water;
   b. first electrical receptacle means in the faceplate for providing an electrical connection with an appliance within the vehicle;
   c. second electrical receptacle means within the housing below the upper wall and above the lower terminus of the sidewalls, the second receptacle means being disposed for disposition outside the vehicle for providing an electrical connection with the external power source; and
   d. electrical conductor means establishing a circuit connection between the first and second electrical receptacle means.

2. The exterior power supply connection claimed in claim 1 wherein:
   the sidewalls each have a notch for disposition over an outer wall of the vehicle to support the power supply connection at least in part by the outer shell.

3. The exterior power supply connection claimed in claim 2 including:
   A clamping frame adapted to bear against the exterior surface of the outer shell of the vehicle and received in the notches; and
   the faceplate being adapted to bear against the interior wall of the vehicle and together with the clamping frame to secure the power supply connection in place in the vehicle when a fastener engages the clamping frame and the housing such that the faceplate and clamping frame bear in compression on their associated vehicle walls.

4. The exterior power supply connection claimed in claim 3 wherein:
   the clamping frame has a gasket for bearing against the outer wall of the vehicle and preventing moisture from entering the vehicle through the hole in the outer wall through which the power supply connection extends.

5. The exterior power supply claimed in claim 4 wherein:
   the second electrical receptacle means is disposed at an angle within the housing to face downwardly and away from the plane of the outer wall of the vehicle.

6. The exterior power supply connection claimed in claim 5 wherein:
   a cover plate secured to the housing is provided for selectively covering the second electrical receptacle means.

7. The exterior power supply connection claimed in claim 6 wherein:
   the housing includes a support plate between the sidewalls and the upper wall to close the bottom of the housing, the cover plate having an opening therein for providing access to the second electrical receptacle means, the cover plate being disposed over the opening.

8. The exterior power supply connection claimed in claim 7 including:
   biasing means for maintaining the cover plate in a closed position.

9. The exterior power supply connection claimed in claim 8 wherein the first electrical receptacle means comprises at least one female receptacle and the second receptacle means comprises a male receptacle mounted so that its contact blades are inwardly of the coverplate.

10. The exterior power supply connection claimed in claim 9 wherein the electrical conductor means includes a circuit breaker means having reset means mounted in the faceplate for access from the interior of the vehicle.

* * * * *